United States Patent [19]

McLean et al.

[11] Patent Number: 4,738,719

[45] Date of Patent: Apr. 19, 1988

[54] STEEL MAKING FLUX

[75] Inventors: Alexander McLean; Iain D. Sommerville, both of Oakville; Paul S. Timmons, Placentia Bay; Michael S. Krugel, Toronto, all of Canada

[73] Assignee: Tenneco Canada Inc. (ERCO division), Islington, Canada

[21] Appl. No.: 35,180

[22] Filed: Apr. 7, 1987

[30] Foreign Application Priority Data

May 9, 1986 [GB] United Kingdom ............... 8611336
Dec. 10, 1986 [GB] United Kingdom ............... 8629514

[51] Int. Cl.$^4$ .............................................. C21B 5/04
[52] U.S. Cl. ........................................ 75/257; 75/24; 75/53
[58] Field of Search ................... 75/24, 30, 57, 53, 58

[56] References Cited

U.S. PATENT DOCUMENTS 2,111,893  3/1938  King ........................................ 75/30
4,340,426  7/1982  Tabei ....................................... 75/53
4,541,863  9/1985  Riboud .................................... 75/24

Primary Examiner—Peter D. Rosenberg
Attorney, Agent, or Firm—Sim & McBurney

[57] ABSTRACT

Phosphorus furnace slag is used as a ladle flux and/or as a tundish flux in the continuous casting of steel. The phosphorus furnace slag uniquely combines the properties of thermal insulation, oxidation protection and inclusion absorption necessary to function satisfactorily as a ladle flux and/or as a tundish flux.

9 Claims, No Drawings

STEEL MAKING FLUX

FIELD OF INVENTION

The present invention relates to steel making and more particularly to fluxes for the tundish and the ladle of a continuous steel casting procedure.

BACKGROUND TO THE INVENTION

In the continuous casting of steel, molten steel is poured from a ladle into a tundish from whence the molten steel passes to the continuous casting mold. There is an increasing demand from customers of continuous casters for improved steel cleanliness and more attention is being paid by steel companies to the factors which influence the quantity of non-metallic inclusions in steel.

Deoxidation of the steel usually is effected in the ladle and some deoxidation products are removed by way of ladle slag. However, reoxidation of the steel and dissolved alloys may occur in the ladle, tundish and the continuous casting mold or during one of the transfer operations, thus adversely affecting the final cleanliness in the steel.

There exists, therefore, a need for a flux for both the ladle and the tundish. An ideal ladle flux material and an ideal tundish flux material should have the following functions:

(a) Thermal insulation of the steel so as to avoid premature freezing and excessive skulling within the ladle or the tundish, (b) Protection of the steel from atmospheric oxidation, and (c) Absorption of inclusions reaching the flux-metal interface.

As is discussed in more detail below, these functions are also required of mold fluxes used in the continuous casting mold but there are other more important properties also demanded of mold fluxes which are not required of a ladle flux or a tundish flux. The better the ladle flux and the tundish flux perform in all three respects, the lesser is the burden imposed on the mold flux in the subsequent continuous casting procedure and hence the better the mold flux is able to function.

The first function of the ladle flux and the tundish flux requires an outer solid particulate layer since heat transfer through a completely liquid layer is quite rapid, while the other two functions require a liquid layer in contact with the molten steel. Relatively little attention has been given to the third requirement but as ladle designs and tundish designs are improved and flow control devices are employed in the ladle and tundish, the extent of inclusion separation is expected to increase, especially if a suitable flux composition can be provided which will absorb the non-metallic reaction products.

It is becoming increasingly standard practice to employ flux material in either the ladle or the tundish or both. Calcium aluminate is commonly used as a flux material in the ladle. Rice hulls usually are used as a flux material in the tundish. Rice hulls, which contain approximately 85% silica, provide very good thermal insulation and are employed mainly for that reason, but are not very effective for oxidation protection or inclusion absorption. Rice hulls are solid at steel-casting temperatures, so that any extent to which the material fulfils the second and third requirements results from fluxing of silica by other oxides, probably iron and manganese oxides produced by reoxidation, to form a liquid layer, a somewhat unsatisfactory condition.

Various mold fluxes also have been used as tundish fluxes. These materials generally are not very effective in terms of thermal insulation, unless a powder layer is maintained, although they usually provide reasonably effective inclusion absorption and protection from oxidation. These materials are formulated to function specifically as mold fluxes and therein lies their drawback as potential tundish fluxes. In addition to the three properties mentioned above, mold fluxes also are required to infiltrate between the solidifying steel and the mold wall in the mold. This characteristic, which is the most important one for a mold flux, much more so than the three functions mentioned above, assists in controlling the rate of heat transfer from the solidifying steel to the mold wall and also results in a lubricant for the solidifying steel as it passes through the mold. In order to provide the flow property, the viscosity of the mold flux at steel-casting temperatures is generally low, usually as a result of the presence of fluidizers, such as sodium oxide, sodium fluoride or calcium fluoride. Carbon also usually is added to control the rate of melting of the mold flux. As a result, the liquidus temperature of mold fluxes is generally in the range of about 1000° to about 1150° C.

Both the low viscosity and the presence of fluidizers are detrimental in both the ladle and the tundish environments, however, since, for example, vortexing in the ladle or tundish as the liquid steel passes to the continuous casting mold can readily result in gross entrainment of the low viscosity material and the fluidizers can cause serious erosion of the refractory material generally used in tundish parts, such as the lining, weirs and ceramic shrouds where submerged nozzles are in use. In addition, as a result of their complex formulation, mold fluxes tend to be rather expensive.

Neither rice hulls nor mold fluxes, therefore, perform satisfactorily in the ladle or tundish since neither possess all the properties necessary to function ideally without introducing additional problems. Similarly, calcium aluminate can be unsatisfactory as a flux due to its limited capacity to absorb alumina and its ability to transfer hydrogen from moist air to molten steel. This effect is undesirable and any tundish or ladle flux should not enhance the transfer of undesirable elements, such as hydrogen from atmospheric moisture, as well as from the flux material itself to the molten steel.

The optimum practical composition for a ladle flux and a tundish flux has a somewhat narrow range of properties, as will be seen from the following discussion. Since a liquid layer is desired in contact with the molten steel, which typically has a temperature in the range of about 1475° to about 1600° C. in both the ladle and the tundish, the flux should be completely molten around 1,450° C., but since too low a viscosity causes problems, as discussed above, the superheat should not be large, so that a liquidus temperature of between 1,350° C. and 1,450° C. is appropriate, a temperature well above that for most mold fluxes. Significant quantities of iron oxides, in the form of FeO or $Fe_2O_3$, or manganese oxide are undesirable since they introduce oxygen into the steel and may ultimately lead to non-metallic inclusions in the solidified product. Further, since one of the main functions of the flux is to absorb inclusions and since most continuously-cast steel slabs are aluminum killed so that the inclusions are alumina or calcium aluminates, the initial alumina content of the flux should be as low as possible, so as to promote inclusion absorption. As previously observed, the quantities of fluidizers, such as sodium oxide, sodium fluoride and calcium fluoride, permitted are severely limited by the melting range, viscosity and refractory erosion considerations. The only oxide left to combine with lime to produce a flux with reasonable melting characteristics is silica.

SUMMARY OF INVENTION

It has now been surprisingly found that phosphorus furnace slag possesses all the properties necessary for a ladle flux and a tundish flux. In accordance with the present invention, therefore, there is provided a process for the continuous casting of steel characterized by the utilization of particulate phosphorus furnace slag as a flux in either the ladle, the tundish or both.

The phosphorus furnace slag usually is used alone as the flux material, without mixing or compounding with other components. Minor quantities of other components may be present for special purposes not directly related to the fluxing activity.

The phosphorus furnace slag is particularly effective as a flux in the ladle or tundish, in that it meets all three of the criteria noted above.

Phosphorus furnace slag has a melting point such that a molten layer is formed on the metal surface from the powder slag layer covering the molten metal in the tundish or ladle. The remainder of the coating remains in powder form, thereby providing thermal insulation of the molten metal and preventing freezing and excessive skulling within the ladle or the tundish.

The presence of the liquid layer on the surface of the molten metal effectively seals off the molten metal from surrounding air, and thereby protects the steel from atmospheric oxidation. As discussed in more detail below, the chemical composition of phosphorus furnace slag is low in alumina, which permits absorption of alumina and similar inclusions reaching the molten flux-molten metal interface. In addition, phosphorus furance slag does not enhance the transfer of other undesirable elements, including hydrogen, to the molten steel.

GENERAL DESCRIPTION OF INVENTION

Phosphorus furnace slag is obtained as a low value by-product of the production of yellow phosphorus by the electrothermal reaction of phosphate rock, silica and carbon, and hence is inexpensive. The slag is tapped from the arc furnace and usually is allowed to cool gradually. In this form, the phosphorus furnace slag has a crystalline structure and may be employed in that form, after provision in an appropriate particle size range.

Alternatively, the slag may be provided in an amorphous form for use herein. One manner of formation of the amorphous form of the slag is to granulate molten slag removed from the furnace by quenching in water. Another manner of formation of the amorphous form of the slag is by pelletizing the water quenched molten slag by the ejectory action of a water-cooled rotating drum and collecting the pellets so formed. The amorphous form of phosphorus furnace slag is preferred for use in the present invention, since the chemical composition is substantially homogeneous, whereas, in the case of crystalline slag, variations in chemical composition are common throughout the mass, which may be undesirable.

The exact composition of the phosphorus furnace slag varies, depending on the proportions of the starting materials employed in the phosphorus furnace. Generally, the composition of phosphorus furnace slag may be considered to be a fluorine-containing calcium silicate having a weight ratio of CaO to $SiO_2$ in the range of about 0.7 to about 1.35, preferably about 0.8 to about 1.2, containing less than about 5 wt.% fluorine. The phosphorus furnace slag also usually contains a variety of other components, examples of which are set forth in Table I below.

Phosphorus furnace slag produced from a typical electrothermal yellow phosphorus production process meets all the above-noted criteria to a significant degree, indicating that the material may be employed as a ladle flux and/or as a tundish flux. The liquidus temperature of phosphorus furnace slag usually is between about 1300° to about 1500° C., depending on the CaO/$SiO_2$ ratio of the slag, i.e., within the desired range discussed above. The liquidus temperature in this range relative to a molten steel temperature of about 1475° to about 1600° C. in both the ladle and the tundish, results in a liquid layer of molten slag on the surface of the metal while the remainder of the powdered slag remains in solid particulate form.

This result has a two-fold effect. The residual particulate material ensures that there is thermal insulation of the body of metal in the ladle or tundish while the liquid layer effectively seals off atmospheric oxygen from the molten metal, ensuring that oxidation of the metal does not occur.

The chemical composition noted above for the phosphorus furnace slag also conforms to that desired for a ladle or a tundish flux, containing low amounts only of $Al_2O_3$, $P_2O_5$, $Fe_2O_3$ and F. Typical compositions for phosphorus furnace slags produced in commercial yellow phosphorus plants produced under differing conditions are set forth in the following Table I:

TABLE I

| Component | A[1] | B[2] | C[3] |
|---|---|---|---|
| | | % by wt | |
| CaO | 45 to 47 | 48 to 50 | 48.45 |
| $SiO_2$ | 43 to 45 | 40 to 42 | 43.93 |
| (wt ratio CaO:$SiO_2$) | (1.0 to 1.09) | (1.14 to 1.25) | (1.10) |
| $Al_2O_3$ | 2 to 3 | 3 | 2.92 |
| $Fe_2O_3$ | 0.5 | 0.1 | 0.26 |
| $P_2O_5$ | 1.5 | 0.45 | 0.7 |
| F | 3 | 3–3.5 | 2.05 |
| MgO | 0.6 | U[4] | U |
| $Na_2O$ | 0.7 | U | U |

Notes:
[1] Typical formulation range for phosphorus furnace slag produced under a first set of production conditions
[2] Typical formulation range for phosphorus furnace slag produced under a second set of production conditions
[3] Formulation of amorphous phosphorus furnace slag given in U.S. Pat. No. 4,340,426
[4] U means unknown In the utilization of phosphorus furnace slag as a ladle flux and/or as a tundish flux, the product is applied to the molten steel in the ladle or the tundish as a particulate layer of a thickness such that the portion of the layer immediately adjacent the steel becomes liquid while the outer portion remains in solid form. In this way, the solid portion achieves thermal insulation of the steel surface while the liquid portion protects the steel from atmospheric oxidation and also acts as an absorption medium for inclusions reaching the flux-metal interface.

A broad range of particle size of particulate phosphorus furnace slag may be employed in the present invention. The range of particle size may vary from pellets to finely pulverized powder, with the choice depending on the physical form in which the phosphorus furnace slag is available.

The following Table II provides a screen analysis of two typical samples of pelletized amorphous slag which may be employed in this invention.

TABLE II

| Screen Size | Sample 1 | Sample 2 |
|---|---|---|
| | (wt. %) | |
| +½ in. | 0 | 0 |
| -½ in. + ⅜ in. | 2.2 | 0.7 |
| -⅜ in. + ¼ in. | U | 4.4 |
| -¼ in. + 4 mesh | 14.1 | 9.1 |
| -4 + 6 | 15.4 | 19.0 |
| -6 + 8 | 24.9 | 27.8 |
| -8 mesh | 43.9 | 37.0 |

The pellets of amorphous slag may be reduced to a smaller particle size, if desired.

The crystalline form of the phosphorus furnace slag usually is available in the form of a solidified mass, which is conveniently reduced to fine particulate form by pulverizing for use herein. However, larger particle sizes of the crystalline form also may be employed.

In some instances it may be desirable to include small quantities of magnesia in the flux composition, perhaps as a top covering on the slag, so as to buffer the slag and minimize any tendency to dissolve magnesia-based refractories used in the ladle and/or the tundish.

The phosphorus furnace slag is sufficiently low in alumina that it is able to absorb significant quantities of alumina, typically about 20 to 30 wt.%, before the melting point and viscosity are adversely affected. When the flux becomes exhausted, it may be removed from the steel surface in the ladle or the tundish in any convenient manner and replaced by fresh material. For example, removal of the spent flux from the tundish conveniently may be effected by raising the level of molten steel in the tundish to an overflow level at which the spent flux may be skimmed or sloughed off. Raising the molten steel level and restoration to the normal level may be achieved by suitable throttling of the flow of molten steel from the tundish to the continuous casting mold or by increasing the steel flow from the ladle.

The applicants are aware that it has previously been suggested in U.S. Pat. No. 4,340,426 to use amorphous phosphorus furnace slag in a continuous casting mold flux composition. As is described in that patent, the mold flux composition usually comprises not only the phosphorus furnace slag but also quantities of an alkali agent, such as an alkali silicate glass, and carbon. The purpose of the presence of these additional constituents has been discussed above with respect to the general criteria for mold fluxes. The presence of these additional materials lowers the melting temperature and renders the resulting composition undesirable for use as a ladle flux or as a tundish flux. There is no disclosure or suggestion in this prior are patent to indicate that it might be possible to utilize particulate phosphorus furnace slag alone, or in combination with minor amounts of other materials, as a flux in the ladle and/or tundish of a continuous steel casting process.

The disclosure herein of the utility of the phosphorus furnace slag as a ladle and/or tundish flux has been mainly directed to aluminum killed steels. However, the same material, i.e. phosphorus furnace slag, may be used with steels deoxidized with manganese and silicon to achieve a significant improvement in the tundish when compared with the use of rice hulls as a tundish flux.

EXAMPLES

Example 1

Samples of commercially-formed powdered amorphous and crystalline phosphorus furnace slag were tested with respect to their viscosity at various temperatures, typical of those encountered in a molten steel environment in the ladle or tundish of a continuous casting plant.

Two groups of samples having differing $CaO/SiO_2$ ratios were tested. For the first group of samples, the $CaO/SiO_2$ weight ratio of 1.01 while for the second group of samples, the $CaO/SiO_2$ weight ratio was 1.18. Both groups of samples had an $Al_2O_3$ content of less than 3 wt.%.

The viscosity determinations were made using the same equipment for viscosity measurements of mold powders. The sample is melted and collected in the Herty viscometer. The Herty viscosity then is the distance the melt has travelled down the tube (in cm). The Herty viscosity of slag having a known composition and known dynamic viscosity (in poise (P)) also was determined and used as a calibration curve to determine the dynamic viscosity of the commercial slag samples.

The viscosity measurements are set forth in the following Table III:

TABLE III

| | Viscosity of Phosphorus Furnace Slag | | | | | | | |
|---|---|---|---|---|---|---|---|---|
| | 1450° C. | | 1500° C. | | 1550° C. | | 1600° C. | |
| Sample description | (cm) | (P) | (cm) | (P) | (cm) | (P) | (cm) | (P) |
| (i) Group I Samples: | | | | | | | | |
| 1. Amorphous | 7.0 | 1.3 | 7.0 | 1.3 | 6.5 | 1.5 | 7.0 | 1.3 |
| 2. Amorphous pelletized | 8.0 | 0.9 | 7.5 | 1.1 | 7.5 | 1.1 | 8.0 | 0.9 |
| 3. Crystalline | 5.0 | 2.1 | 5.5 | 1.7 | 6.5 | 1.5 | 7.0 | 1.3 |
| (ii) Group II Samples: | | | | | | | | |
| 4. Amorphous | 6.5 | 1.5 | 8.5 | 0.7 | 10.0 | 0.1 | 10.0 | 0.1 |
| 5. Amorphous pelletized | 6.0 | 1.7 | 8.0 | 0.9 | 10.5 | 0.1 | 10.0 | 0.1 |
| 6. Crystalline | 5.5 | 1.7 | 7.5 | 1.1 | 8.0 | 0.9 | 8.5 | 0.7 |

Note:
Samples 2 and 5 were pulverized before testing and therefore were equivalent to samples 1 and 4, respectively.

As may be seen from the above Table III, all the samples were liquid at the experimental temperature, which corresponded to typical ladle and tundish temperatures, and which indicates that they are effective in preventing oxidation of molten steel in a ladle or tundish. The viscosity decreased with increasing temperature and the effect was more pronounced for the first group of samples than the second group. In addition, the viscosity of amorphous slag is slightly lower than that of crystalline slag.

Example 2

The viscosity of slag samples with varying quantities of alumina was determined as described in Example 1. Samples were prepared by mixing slag with reagent grade alumina and Herty viscosity was determined at 1550° C. Dynamic viscosity was determined by calibration, as described in Example 1. The results are set forth in the following Tables IVA and IVB:

TABLE IVA

Herty Viscosity of Phosporus Furnace Slag With Added Al₂O₃ (cm)

| Sample Description | 5% | 10% | 15% | 20% | 25% |
|---|---|---|---|---|---|
| (i) Group I Samples: | | | | | |
| Amorphous | 6.3 | 4.9 | 4.3 | 3.7 | 2.9 |
| Crystalline | 6.5 | 5.5 | 4.5 | 3.5 | 3.0 |
| (ii) Group II Samples: | | | | | |
| Amorphous | 5.6 | 4.9 | 4.2 | 2.8 | 2.7 |
| Crystalline | 7.0 | 5.5 | 5.0 | 2.5 | 2.0 |

TABLE IVB

Dynamic Viscosity of Phosphorus Furnace Slag With Added Al₂O₃ (P)

| Sample Description | 5% | 10% | 15% | 20% | 25% |
|---|---|---|---|---|---|
| (i) Group I Samples: | | | | | |
| Amorphous | 1.6 | 2.1 | 2.4 | 2.6 | 3.0 |
| Crystalline | 1.5 | 1.7 | 2.3 | 2.7 | 2.9 |
| (ii) Group II Samples: | | | | | |
| Amorphous | 1.9 | 2.1 | 2.4 | 3.0 | 3.1 |
| Crystalline | 1.3 | 1.7 | 2.1 | 3.1 | 3.4 |

As may be seen in the above Table IV, the viscosity of all slag samples increased with increasing alumina concentration. The alumina absorption decreased with increasing viscosity but up to 25 wt.% alumina absorption was observed. These results show that alumina contained in molten steel may be removed in significant amounts within the tundish and ladle.

Example 3

The shroud erosion index (SEI) for fused silica by the phosphorus furnace slag samples was determined. The shroud erosion index is an indication of the relative erosion of a shroud test piece (fused silica) by the test material.

Slag was heated to 1500° C., the fused silica was dipped into the resulting melt for four hours and the resulting erosion was measured. The erosion determined then was compared to that of a similar shroud test piece dipped into a standard mould powder under the same conditions. The SEI test was repeated at 1550° and 1575° C. The results obtained are set forth in the following Table V:

TABLE V

Shroud Erosion Index of Slag Samples*

| Sample Description | 1500° C. | 1550° C. | 1575° C. |
|---|---|---|---|
| (i) Group I Samples: | | | |
| Amorphous | 0.97 | 0.89 | 0.86 |
| Crystalline | 0.61 | 0.60 | 0.62 |
| (ii) Group II Samples: | | | |
| Amorphous | 1.08 | 1.05 | 0.98 |
| Crystalline | 0.92 | 0.78 | 0.75 |

*The comparison of shroud erosion index was with respect to the mold powder known by the trademark SCORIALIT 1/STG, for which the SEI is considered to be 1.

As may be seen from the results outlined in Table V, all the slag samples gave the same or slightly smaller erosion of fused silica test pieces than Scorialit 1/STG, with smaller numbers corresponding to lower erosion. The SEI did not change significantly with increasing temperature. The crystalline slag was found to be less corrosive than the amorphous slag and the Group II samples were slightly worse than the Group I samples.

Example 4

The effect of phosphorus furnace slag on tundish liner material was determined. Test pieces of "GARNEX" (trademark) DR658-26 tundish liner were cut in dimensions 1 inch×1 inch×5 inch. An attempt to duplicate the SEI test of Example 3 on this material failed, mainly because the organic binder present in the tundish liner was burned off under the conditions of testing. The test pieces turned to powder but the resulting material did not dissolve in the molten slag.

The results of the testing set forth in Examples 1 to 4 demonstrate the suitability of phosphorus furnace slag material, either in amorphous or crystalline form, as tundish or ladle fluxes in steel making.

SUMMARY OF DISCLOSURE

In summary of this disclosure, the present invention provides a novel utility for phosphorus furnace slag as a tundish and/or ladle flux in continuous steel casting. Modifications are possible within the scope of this invention.

What we claim is:

1. In the casting of steel wherein molten steel is located in a ladle, a tundish or both, the improvement which comprises utilizing as a flux in at least one of said ladle and said tundish, an additive consisting essentially of particulated phosphorus furnace slag in an amount sufficient to cover the surface of the molten steel and to provide a molten layer thereof in contact with the surface of the molten steel and a solid powder layer in contact with the molten layer, said phosphorus furnace slag being provided as a by-product from the production of yellow phosphorus by the electrothermal reaction of phosphate rock, silica and carbon and having a weight ratio of CaO to SiO₂ of about 0.7 to about 1.35.

2. The process of claim 1 wherein said phosphorus furnace slag is in crystalline form.

3. The process of claim 1 wherein said phosphorus furnace slag is in amorphous form.

4. The process of claim 1 wherein said phosphorus furnace slag has a particle size ranging from pellets to very finely pulverized particles.

5. The process of claim 1 wherein said phosphorus furnace slag has a weight ratio of CaO to SiO₂ of about 0.8 to about 1.2.

6. The process of claim 1 wherein said phosphorus furnace slag has a weight ratio of CaO to SiO₂ of about 0.8 to about 1.2 and contains less than 5 wt.% fluorine.

7. The process of claim 1 wherein said phosphorus furnace slag has a liquidus temperature of about 1300° to about 1500° C.

8. The process of claim 1 wherein said steel is aluminum-killed steel which is cast by a continuous operation.

9. The process of claim 1 wherein said steel is manganese-silicon killed steel which is cast by a continuous operation.

* * * * *